Oct. 14, 1947.   G. N. SERY   2,429,076
ART OF ATTACHING FERRULES
Filed March 16, 1945
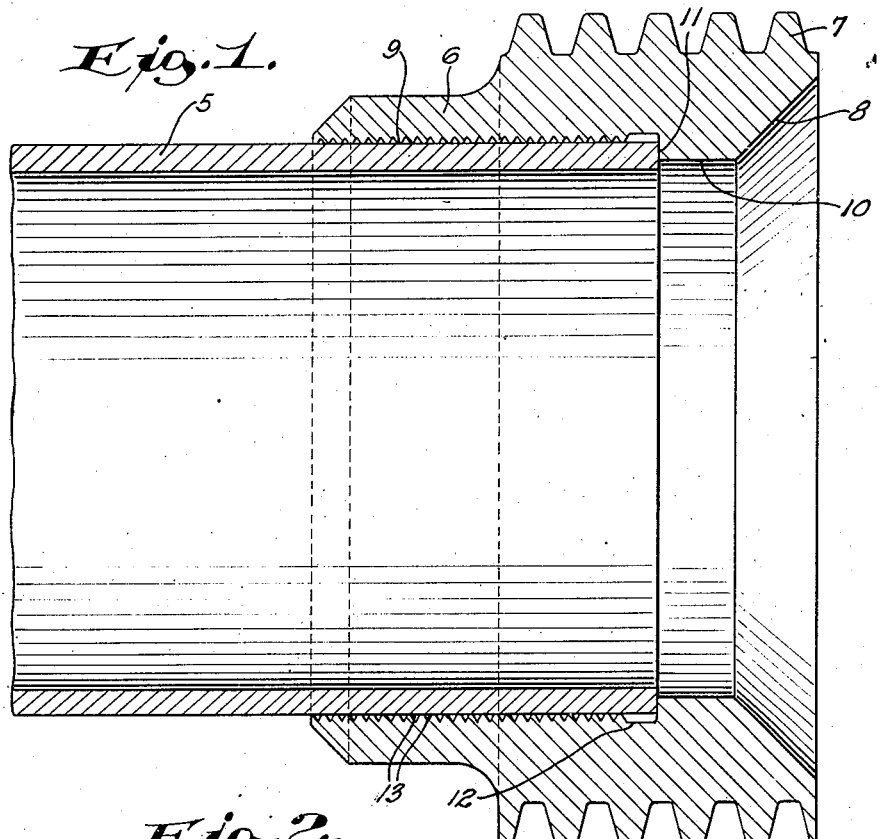
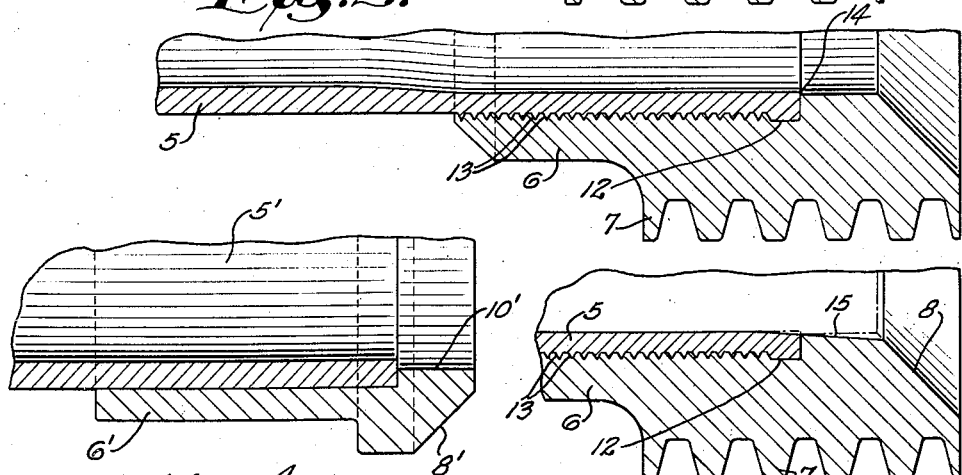
INVENTOR.
George N. Sery
BY Morsell & Morsell
ATTORNEYS.

Patented Oct. 14, 1947

2,429,076

UNITED STATES PATENT OFFICE 2,429,076

ART OF ATTACHING FERRULES

George N. Sery, Kenosha, Wis., assignor to Tri-Clover Mach'ne Co., Kenosha, Wis., a corporation of Wisconsin Application March 16, 1945, Serial No. 583,062

1 Claim. (Cl. 285—56)

This invention relates to improvements in the art of attaching ferrules.

Heretofore, in attaching a ferrule to the end of a tube, it has been customary to bore the ferrule straight through, slip the ferrule onto the end of the tube, place the ferrule in a holding block, and expand the tube from the inside into tight engagement with the ferrule. Due to the fact that most ferrules are formed with a flared or bevelled seat, it is necessary, after expansion of the tube, to use a reseating tool and cut away quite a bit of the end of the tubing in order to conform said end with the bevel on the ferrule. This work is usually done in the field and is troublesome because there is quite a bit of metal to cut away and when using stainless steel it is a slow and difficult operation. Furthermore, the flared seat is not as perfect as it was prior to the attachment of the ferrule to the tube because the ferrule originally comes from the shop with a perfectly machined seat.

It is a general object of the present invention to provide an improvement in the art of attaching ferrules which eliminates the necessity of reseating in the field.

A further object of the invention is to provide a method of attaching ferrules wherein the ferrule is formed with a bore portion of one diameter near the seat forming end, and with a main bore portion of greater diameter, there being a shoulder between said two bore portions against which the end of the tube is positioned, the tube being then expanded into tight engagement with the ferrule and having an internal diameter after expansion which is less than the internal diameter of the auxiliary bore portion of the ferrule. Thus, where the ferrule is formed with a bevelled seat, the end of the tube is prevented by the shoulder from interfering with the seat, and the surface of the tube near the shoulder may be blended into the surface of the shoulder by a simple hand grinding operation. Due to the fact that the inside diameter of the shoulder portion of the ferrule is larger than the inside diameter of the tube after expansion, the expanding tool may be kept away from the shoulder so as not to disturb the seat on the ferrule. Thus, no reseating in the field is required.

A further object of the invention is to provide a ferrule construction and method wherein when extra holding power is required, one or more grooves may be formed in the main bore of the ferrule so that when the tube-end is expanded, the metal will flow into the grooves to provide a strong connection. These grooves may take the form of a single annular groove next to or spaced inwardly from the shoulder of the ferrule, a series of small serrations, or both a main groove and serrations.

With the above and other objects in view, the invention consists of the improvements in the art of attaching ferrules, and all its parts and combinations, as set forth in the claim, and all equivalents thereof.

In the accompanying drawing, illustrating several embodiments of the invention, in which the same reference numerals designate the same parts in all of the views:

Fig. 1 is a longitudinal sectional view through a tube-end showing a ferrule positioned thereon before the tube has been expanded;

Fig. 2 is a fragmentary longitudinal sectional view showing the condition of the parts after expansion;

Fig. 3 is a fragmentary longitudinal sectional view showing the condition of the parts after expansion and after the hand grinding operation; and Fig. 4 is a fragmentary longitudinal sectional view illustrating a modified construction, before expansion of the tube, wherein there are no grooves or serrations in the ferrule and wherein the ferrule has an external rather than an internal bevel.

Referring more particularly to the drawing, the numeral 5 designates the end-portion of a metal tube. Where the tube and fitting are used in connection with pasteurizing equipment the parts are usually formed of stainless steel. The ferrule, designated generally by the numeral 6, may be any type of ferrule which it is customary to connect to the end of a pipe. In the construction illustrated in Fig. 1, the ferrule is provided with external threading 7 for cooperation with the internal threading of the usual union nut. The ferrule illustrated in Fig. 1 is also formed with a machined internal bevel 8 which is cooperable in the usual manner with a cooperating bevel on a fitting or pipe to be connected thereto.

Instead of having a bore extending straight through the ferrule, the latter is provided with a main bore portion 9 which terminates short of the flared seat 8, and with an auxiliary bore portion 10 which is of less diameter than the diameter of the main bore portion 9. Between the two bore portions 9 and 10 there is an annular shoulder 11.

If pressures during use are high so that good holding power is required, the bore portion 9 may be formed with one or more grooves or indentations. The main annular groove 12 is preferably located next to the shoulder 11. This groove, however, may be spaced inwardly from the shoulder if desired. In addition to the main groove 12, it is preferred to also utilize a plurality of smaller grooves or serrations 13. The grooves 12 and 13 preferably extend completely around the bore. For certain requirements a single annular groove 12 may suffice. For other requirements the smaller indentations 13 without the main groove 12 may be sufficient. Where the holding requirements are not high the grooves and serrations may both be omitted as is illustrated in Fig. 4.

In effecting a connection between a ferrule such as the ferrule 6 and the end of a tube 5, the tube is inserted in the ferrule until its end abuts the shoulder 11 as is illustrated in Fig. 1. It is important that the internal diameter of the tube be less than the internal diameter of the bore portion 10 of the ferrule. After the tube end is inserted the ferrule is placed in a holding block and an expanding tool such as the tool illustrated in Fig. 3 of Hinrichs Patent No. 2,335,414, dated November 30, 1943, is inserted into the ferrule and tube-end. Due to the fact that the internal diameter of the auxiliary bore portion 10 of the ferrule is greater than the internal diameter of the tube 5, the expanding tool will engage only the interior of the tube. The tube is expanded from the condition of Fig. 1 to the condition of Fig. 2, causing the metal of the tube to flow into the annular grooves 12 and 13 to effect a firm connection. It is important that the diameter of the auxiliary bore portion 10 be greater than the final expanded internal diameter of the tube 5 as is illustrated in Fig. 2. By following this method, contact of the expanding tool with the flared seat 8 is prevented. Thus, no damage can be done to the seat and it remains in the perfectly machined condition that it was in when it left the shop. Thus, after expansion of the tube there is no necessity for reseating the ferrule in the field.

After the tube has been expanded, as illustrated in Fig. 2, it is desirable to eliminate the slight annular shoulder indicated by the numeral 14. This may be accomplished by a simple hand grinding operation which grinds off the metal from the dot-and-dash lines of Fig. 3 to the full line 15. This hand-grinding will in no way injure the bevelled seat 8.

In the modification of Fig. 4, the tube 5' is illustrated in position within a ferrule 6' before expansion of the tube 5'. The ferrule illustrated has an auxiliary bore portion 10' which is of greater diameter than the internal diameter of the tube 5', both before and after expansion of the tube. The ferrule illustrated in Fig. 4, instead of having an internal bevel, has an external bevel 8'.

To effect an attachment between the tube 5' and the ferrule 6', the same procedure heretofore described in connection with Fig. 1 is carried out. No grooves, however, are indicated in the ferrule as these are not always necessary when holding requirements are low. After expansion of the tube 5', the wall thickness of the portion inserted within the ferrule is reduced just as in Fig. 2, and the final internal diameter of the tube 5' is slightly less than the diameter of the auxiliary bore portion 10'. After expansion a hand-grinding operation may be performed just as illustrated in Fig. 3.

The improved method of attaching ferrules is particularly suited for use in connection with pipes to be used in the food industry wherein sanitation is a factor. It is apparent that after attachment of the tube to the ferrule has been completed that the inner-surface of the tube is smooth and there are no ridges or projections to trap material flowing through the pipe. It is also apparent that by preventing damage to the ferrule seat as it comes from the shop, that a cleaner and more perfect joint may be made with an adjacent pipe section.

The present method of attaching ferrules greatly simplifies work in the field because the necessity of reseating in the field is entirely eliminated, and the simple hand-grinding operation required is such that it can be quickly performed.

The invention is suited for use in connection with ferrules of other types than those illustrated. Various changes and modifications may be made without departing from the spirit of the invention, and all of such changes are contemplated as may come within the scope of the claim.

What I claim is:

In combination, a ferrule having a cylindrical main bore portion and having a concentric cylindrical auxiliary bore portion near one end which is of less diameter than the main bore portion to form a shoulder at one end of said auxiliary bore portion, said ferrule having a tapered seat extending from the opposite end of said auxiliary bore portion, a tube having an end portion projecting into said main bore portion of the ferrule with the end of the tube abutting said ferrule shoulder, there being an expanded attachment between the tube and said main bore portion, a portion of the inner surface of the tube at the end thereof and the surface of the auxiliary bore portion being ground to provide a slight flare and a smooth surface at the junction between the end of the tube and said auxiliary bore portion, the internal diameter of said auxiliary bore portion of the ferrule being greater than the internal diameter of the most widely expanded unground portion of the tube.

GEORGE N. SERY.

REFERENCES CITED

The following references are of record in the file of this patent:

UNITED STATES PATENTS

| Number | Name | Date |
| --- | --- | --- |
| 1,794,849 | Hagstedt | Mar. 3, 1931 |
| 1,891,304 | Everett | Dec. 20, 1932 |
| 1,915,008 | Youker | June 20, 1933 |
| 2,252,274 | Rossheim et al. | Aug. 12, 1941 |
| 2,258,751 | Evans | Oct. 14, 1941 |